United States Patent [19]
Okada et al.

[11] Patent Number: 6,103,401
[45] Date of Patent: Aug. 15, 2000

[54] WINDOW FOR AN OPTICAL USE AND A PROCESS FOR THE PRODUCTION OF THE SAME

[75] Inventors: Norio Okada, Tokyo; Shuji Asaka; Tsuneo Urisu, both of Aichi; Yoshiyuki Yamamoto, Hyogo; Keiichiro Tanabe, Hyogo; Yoshiaki Kumazawa, Hyogo, all of Japan

[73] Assignee: Sumitomo Electric Industries, Ltd., Osaka, Japan

[21] Appl. No.: 08/793,982

[22] Filed: Jun. 16, 1997

[30]    Foreign Application Priority Data

Jul. 14, 1995  [JP]  Japan ................................. 7-178660

[51] Int. Cl.$^7$ ............................. B32B 3/10; B32B 15/04; C23C 16/26; B05D 3/02
[52] U.S. Cl. .......................... 428/634; 428/141; 428/192; 428/687; 428/596; 228/124.6; 359/350; 427/162; 427/450; 427/249; 427/374.1; 83/23
[58] Field of Search ................................. 228/121, 122.1, 228/124.6; 378/161; 356/440; 428/688, 689, 698, 699, 910, 544, 551, 673, 138, 141, 192, 194, 263, 332, 655, 660, 661, 663, 668, 669, 670, 672, 687, 615, 634, 596; 427/122, 164, 249, 162, 450, 255, 374.1; 117/929; 359/350; 216/79, 81

[56]         References Cited

U.S. PATENT DOCUMENTS 4,939,763  7/1990  Pinneo et al. ............................ 378/161
5,046,854  9/1991  Weller et al. ............................ 356/440
5,159,621  10/1992  Watanabe et al. ....................... 378/161
5,317,618  5/1994  Nakahara et al. ....................... 378/161
5,607,723  3/1997  Plano et al. .............................. 427/249
5,627,872  5/1997  Verga ....................................... 378/161
5,643,423  7/1997  Kimock et al. .................... 204/192.35
5,860,584  1/1999  Inazura .................................... 228/121

FOREIGN PATENT DOCUMENTS 63-201601  8/1988  Japan .

Primary Examiner—Deborah Jones
Assistant Examiner—Michael LaVilla
Attorney, Agent, or Firm—Wenderoth, Lind & Ponack, L.L.P.

[57]           ABSTRACT

An object of the invention is to provide a window for an optical use having excellent transmission property over a wide range of from infra-red to vacuum ultraviolet as well as excellent baking resistance and capable of being fitted to an ultra-high vacuum apparatus and a process for the production of the same.

This object can be attained by a window for an optical use comprising a diamond as a window material, a flange for a vacuum apparatus, a frame for bonding the diamond to the flange and the specified adhesive material for bonding the frame and diamond, and a process for the production of the window for an optical use comprising a step of preparing a diamond plate, a step of fitting a frame to a flange and bonding the diamond plate to the frame through an adhesive material. The benefits can be enlarged by suitably selecting the shape, material, etc. of the frame.

20 Claims, 4 Drawing Sheets

41 Au FILM
22 CONFLAT FLANGE

42 ADHESIVE MATERIAL (AgCl)
31 DIAMOND
22 CONFLAT FLANGE

45 ROUGHLY WORKED FLAME 45　46 FLANGE

47 FRAME　46 FLANGE

WINDOW FOR AN OPTICAL USE AND A PROCESS FOR THE PRODUCTION OF THE SAME

TECHNICAL FIELD

This invention relates to a window for optics or optical uses and a process for the production of the same and more particularly, it is concerned with a window for an optical use, having excellent transmission property over a wide range of from infra-red to vacuum ultraviolet and capable of being fitted to an ultra-high vacuum apparatus and resistant to baking, and a process for the production of the same.

BACKGROUND

It is necessary to have special functions for a window for an optical use, to be fitted to a vacuum apparatus used, for example, in the case of carrying out an optical measurement in a range of vacuum ultraviolet to infrared or in a further wide wavelength range in ultra-high vacuum. In particular, two of these functions are required, i.e. that a window material having a high percent transmission as to a wide range wavelength is used and that a fitted part of the window material is in such a connection state that the fitted part is resistant to baking at a temperature as high as possible. For such a use, $CaF_2$, LiF, $BaF_2$, NaCl, etc. have been used as a window material because of their higher transmittance over a wide range. Since a flange for fitting to a vacuum apparatus and a material for the window material have different coefficients of thermal expansion, however, the window material is subject to strain and broken when the baking temperature is higher.

Thus, in order to absorb the difference in coefficients of thermal expansion between the flange and window material, the following method is employed. That is, this method comprises bonding the flange and window material through a frame and adhesive material. In this method, firstly, the frame to be fitted with the window material is bonded to the flange. Then, an Au film is formed on the window material. This is formed by uniformly coating liquid gold onto an edge (surface in contact with frame) of the window material in such a manner that the coating is not uneven and then subjecting to a heat treatment (500 to 600° C.). When an adhesive material is mounted on a butt surface of the frame and window material and subjected to a heat treatment, the frame and the window material are bonded through the adhesive material. The thus resulting window material for an optical use is resistant to ultra-high vacuum by sealing with the above described adhesive material. This method has an advantage that stress is absorbed by a frame when using a material having a relatively close coefficient of thermal expansion to that of the optical window material as an adhesive material and a relatively deformable metal for the frame.

A window for an optical use, capable of being resistant to high vacuum and being subjected to baking at a high temperature by the use of such a frame and adhesive material, can be obtained, but has the following problem.

Namely, as an intensity of a light to be transmitted through a window is increasing with development of a light source, the window material as described above cannot neglect heat generation due to energy loss during transmission of the light. In order to decrease the energy loss, the thickness of a window material can be decreased, but a thickness of at least a certain value is required for resisting vacuum and accordingly, decrease of the thickness of the window material is naturally limited. Furthermore, when the thickness of a frame is increased, strain is directly transferred to the window material and the absorbing effect of strain of the adhesive material is thus decreased. Accordingly, it is necessary to decrease the thickness of the frame. However, heat generated in the window material is transmitted to a vacuum flange through the frame, cooling being effected therefrom, and if the thickness of the frame is decreased, accordingly, the cooling efficiency is markedly lowered.

The present invention has been accomplished in view of the problems of the prior art and aims at providing a window for an optical use, having excellent transmission property over a range of from vacuum ultraviolet to infrared or further wide wavelength range as well as excellent durability and capable of transmitting a light having a large energy and being fitted to an ultra-high vacuum apparatus, and a process for the production of the same.

DISCLOSURE OF THE INVENTION

The inventors have made various studies on windows for high vacuum to achieve the above described object and thus have reached the present invention. That is, the present invention has the following features:

(1) A window for an optical use, comprising a window material of diamond, a flange for a vacuum apparatus, a frame for bonding the diamond to the flange and an adhesive material for bonding the frame and diamond, the adhesive material comprising an element selected from the group consisting of Ti, Si, Ni, Hf, Zr, V, Nb, Ta, Cr, W, Pt, Mo, Ta, Os, Re, Rh, Au, Ag, Sn and Pb, mixtures or alloys of at least two of these elements, oxides, nitrides, carbides or halides of these elements or laminated layers thereof.

(2) The window for an optical use, as described in (1), wherein the adhesive material is an adhesive material predominantly consisting of AgCl or Ag.

(3) The window for an optical use, as described in (1), wherein the adhesive material is an adhesive material having a laminated structure of Au/AgCl in order from the diamond side.

(4) The window for an optical use, as described in (1), wherein the adhesive material is an adhesive material having a laminated structure of Ti/Pt/Au/AgCl or Ti/Mo/Au/AgCl in order from the diamond side.

(5) The window for an optical use, as described in any one of (1) to (4), wherein the material of the frame is at least one member selected from the group consisting of Ag, Au and Cu.

(6) The window for an optical use, as described in any one of (1) to (5), wherein the frame is a cylindrical frame having optionally, at the upperside, a brim for bonding to a flange and at the lower side, another brim for bonding to a window material.

(7) The window for an optical use, as described in (6), wherein the cylindrical part of the frame has a thickness of 0.05 to 5 mm.

(8) The window for an optical use, as described in any one of (1) to (7), wherein the diamond of the window material is a diamond prepared by a gaseous phase synthesis method.

(9) The window for an optical use, as described in (8), wherein the diamond of the window material is polycrystalline diamond.

(10) The window for an optical use, as described in (9), wherein the diamond of the window material is a diamond of a columnar crystal.

(11) The window for an optical use, as described in (10), wherein the diamond of the window material is a diamond having an orientation of (100).

(12) A process for the production of a window for an optical use, which comprises a step of forming diamond on a substrate plate by a gaseous phase synthesis method, a step of removing the substrate plate from the diamond grown on the substrate plate, obtained in the former step, to obtain a diamond self-standing film, a step of flattening the surface of the diamond self-standing film, a step of fitting a frame to a flange, bonding a window material consisting of the diamond self-standing film to the frame through an adhesive material and thereby fitting the diamond window material to the flange.

(13) The process for the production of a window for an optical use, as described in (12), wherein the step of removing the substrate plate from the diamond grown on the substrate plate to obtain a diamond self-standing film is carried out by dissolving the substrate plate with an acid.

(14) The process for the production of a window for an optical use, as described in (12) or (13), wherein the step of bonding a window material consisting of the diamond self-standing film to the frame through an adhesive material and thereby fitting the diamond window material to the flange comprises a step of arranging a metal on a part or whole part of the diamond window material part in contact with the frame.

(15) The process for the production of a window for an optical use, as described in (14), wherein the step of arranging a metal on a part or whole part of the diamond window material part in contact with the frame comprises a step of coating a metallic paste consisting of the metal dispersed in an organic solvent onto a required area and a step of subjecting to drying and calcining through a heating treatment.

(16) The process for the production of a window for an optical use, as described in any one of (12) to (15), wherein the step of fitting a frame to a flange is a step of welding a roughly worked frame to the flange and thereafter subjecting to lathing in a predetermined shape.

(17) The process for the production of a window for an optical use, as described in any one of (12) to (16), wherein the step of fitting the diamond window material to the flange through an adhesive material between the metal on the diamond window material and the frame comprises a step of heating the diamond window material, frame and flange at a temperature of at least the melting point of the adhesive material, a step of melting and pouring the adhesive material in the bonding part and a step of gradually cooling the diamond window material, frame and flange.

BEST EMBODIMENT FOR CARRYING OUT THE INVENTION

According to the present invention, there can be provided a window for an optical use, having a markedly improved strength and thermal conductivity, as well as a light transmission in a very wide range over infrared to vacuum ultra-violet and an improved transmittance because of a decreased thickness of the window material.

Diamond and a frame can readily be bonded with improvement of the vacuum resistance and resistance to baking by using, as an adhesive material for bonding the frame and diamond as a window material, a simple substance of an element selected from the group consisting of Ti, Si, Ni, Hf, Zr, V, Nb, Ta, Cr, W, Pt, Mo, Ta, Os, Re, Rh, Au, Ag, Sn and Pb, mixtures or alloys of at least two of these elements, oxides, nitrides, carbides or halides of these elements or laminated layers thereof.

Furthermore, because of much larger strength of the window material of the present invention as compared with the window materials of the prior art, the thickness of a frame capable of absorbing strain can be increased and the cooling efficiency itself of a high vacuum window can be improved.

In the window for an optical use according to the present invention, the material of a flange is not particularly limited, but SUS 304 used for a flange for an ultra-high vacuum use or other metals, alloys, etc. each having such a clean surface that problems such as degassing do not arise can ordinarily be used.

Generally, a window material which will surely be used in ultra-high vacuum apparatus, cryogenic apparatus, etc. must be fixed to a flange so as to be connected with these apparatuses. However, direct bonding and fixing of the window material to the flange tends to result in breakage of the window due to difference of the coefficients of thermal expansion or strain of the flange itself caused by bolt fastening during fitting the flange to the ultra-high vacuum apparatus. Thus, in the present invention, a window material is bonded to a flange using a frame and adhesive material.

Figure 1A:
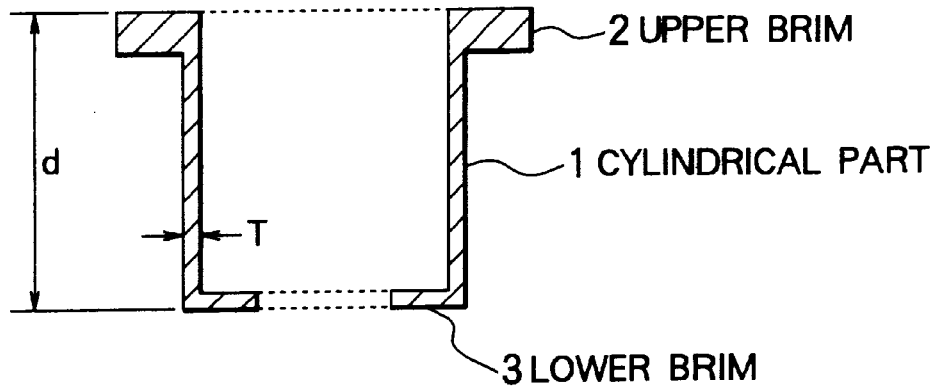
FIG. 1 is a schematic view of a frame used for the window for an optical use of the present invention.
Figure 1B:
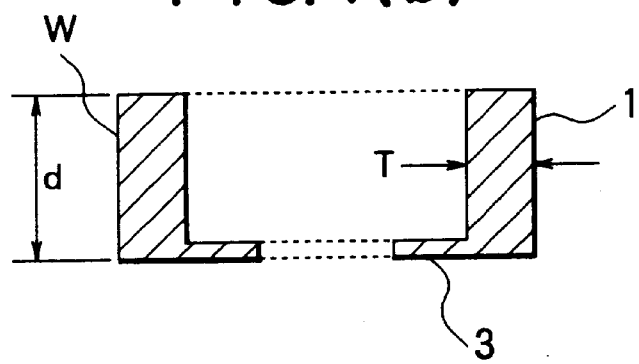

The frame functions as an attachment for bonding a window material to a flange and for example, it is a cylindrical hollow frame having brims (overlap widths) 2, 3 for bonding at the upper and lower parts of a cylindrical part 1, as shown in FIG. 1 (a). The upper brim 2 of this frame is bonded to a flange and a window material is fixed to the lower brim 3. This frame plays a role of moderating stress caused by a difference in coefficient of thermal expansion acting between the flange and window material or a strain of the flange, formed by bolt fastening during fitting the flange to the ultra-high vacuum apparatus. Thus, if the hardness thereof is too large, it cannot play such a role, while if too soft, it cannot play the role as a vacuum partition. Since the window material produces heat when it transmits a light with a large energy, furthermore, the window material is preferably formed of a material with a large thermal conductivity so as to remove the heat from the window material with a high efficiency. As the material, there can be used Ag, Au, Cu, Al, bronze, duralmin, etc., but particularly, Ag, Au and Cu is preferable. In this frame, the upper brim 2 for fitting to the flange is not always necessary, but a frame provided with only the lower brim 3, as shown in FIG. 1 (b), can of course be used. In this case, the frame is welded to the flange at a part W of the frame shown in FIG. 1 (b).

When the flange itself is made of a metal of the above described materials, the window material is free from strain, but the flange itself tends to be deformed, so vacuum seal is difficult. Accordingly, the flange itself is made of a high rigidity material and a frame and adhesive material, which will function as a buffer, are inserted in between the window material and flange, so that the window material is not subject to various strains. In a window for an optical use, using a frame of the prior art, such a structure has been employed that strains added to the window by thermal stress, etc. are absorbed by deformation of this frame and stress is hardly added to the window, but it is required to make the thickness of a cylinder of the frame thinner so as to prevent the window material from breakage. When using diamond as a window material, however, the thickness of a cylinder of the frame can be made larger than in the case of using a window material consisting of the material having hitherto been used, resulting in reduction of the thermal resistance at the part of the frame. Considering prevention of the breakage and reduction of the thermal resistance, the thickness T in FIG. 1 is adjusted to 0.05 to 5 mm, preferably 0.5 to 5 mm. When the length d in FIG. 1 is longer, the above described moderating effect of strain is increased, but when shorter, the thermal resistance is smaller. For practical use, a much larger length should be avoided, since the window material is protruded from the thickness of the flange which is inconvenient. Accordingly, a suitable range thereof is 1 to 25 mm.

The adhesive material plays a role of fixing a diamond window material to the above described frame and vacuum sealing. In the window material of the prior art, a necessary part is coated with Au and a clearance between the frame and the window material is bonded and sealed with an adhesive material such as AgCl. In the case of bonding a diamond window material, the similar method can also be applied, but Au has such a low wetting property with diamond that a good film cannot be formed in many cases. Thus, when using an Au film, a surface of diamond is first coated with a material having a tendency of forming a carbide and then coated with Au, whereby a good Au film can be formed. As a material to directly be coated onto the above described diamond, there are Ti, Hf, Zr, V, Nb, Ta, Cr, Mo, W, Ni and Si. It is more preferable to coat Au after coating an intermediate layer of Pt, Mo, etc. between the Au film and the metallic film, since the stability of the metallic laminated film is increased. As the above described intermediate layer, there can be used metals such as Pt, Mo, Ta, Os, Re, Rh, etc., or alloys, oxides, carbides, nitrides and halides thereof and more preferably, Pt or Mo can be selected. For the lamination of these metallic films, any known methods can be used, for example, vacuum deposition methods, ion plating methods, etc.

In addition to the above described metallizing methods, a metallic film can be formed by preparing a metallic composition of a metal for forming the film dispersed in an organic solvent, directly coating the metallic composition onto diamond, drying and calcining. In this case, the metallic film can be formed on a predetermined position more readily as compared with the above described vacuum deposition methods, ion plating methods, etc.

Bonding of diamond and a flange (a frame) is carried out by allowing a brazing material consisting predominantly of AgCl, Ag or Au, for example, Au-Si, Au-Sn, etc. to be present between a diamond plate metallized at a predetermined position as described above and a frame, heating the brazing material up to its melting temperature and gradually cooling.

The diamond used as a window material should have a shape to be fitted to shapes of a flange and frame and to this end, a diamond in the form of a flat plate of at least 3 mm in diameter is required. Accordingly, an artificial diamond synthesized at a high temperature and high pressure or naturally occurring diamond is very expensive for satisfying such a requisite. In contrast, a diamond prepared by a gaseous phase synthesis method is convenient because of readily providing a large area with a lower cost.

The diamond to be used may be a single crystal diamond, but polycrystalline diamond can be used. As to the production cost, polycrystalline diamond is reasonable in price and more favorable, but joint use of single crystal diamond and polycrystalline diamond is of course possible.

The shape of a diamond window material is ordinarily a disk with a diameter of at least 3 mm, preferably at least 5 mm, more preferably at least 10 mm, but it is not necessarily circular and can be any of various shapes, e.g. square. In the case of a non-circular form, however, a stress imposed on the window is not uniform and a disk-like shape is preferable.

A window material is not resistant to vacuum if the thickness thereof is too small, while it is expensive and results in lowering of the transmittance if too thick. The lower limit of the thickness should be raised with increase of the opening diameter of the window. In the case of a disk-shaped window material, when the opening diameter of a window is designated as D (mm) and the thickness of a diamond film is designated as t (mm) relationships of $t \geq 8.71 \times 10^{-3}$ D, in particular, $t \geq 0.015$ D should preferably be satisfied. The upper limit of the thickness is preferably 2 mm, more preferably 300 $\mu$m.

In a diamond grown by a gaseous phase synthesis method, an idiomorphic form of diamond appears at the top surface side to result in marked roughness in many cases. By "Idiomorphic Form" is meant a crystal form completely surrounded by intrinsic crystal faces of diamond. If there is such a roughness, scattering is sometimes a problem when using it as a window. In the case of using a diamond grown by a gaseous phase synthesis method as a window material, therefore, the surface is preferably smoothened, for example, by polishing.

When using a plate of polycrystalline diamond, there arises sometimes a a problem as to scattering at crystal grain boundaries. The polycrystalline diamond by the gaseous phase synthesis method has such a tendency that crystal grains are small in the vicinity of a substrate and grain boundaries are relatively increased. The scattering by the crystal grain boundaries can also be decreased at the bottom surface side by, for example, a method of polishing a thickness of at least 5 $\mu$m.

A window with a larger area and minimized scattering can economically be prepared, although being polycrystalline, by using, as a polycrystalline diamond, a diamond having a columnar crystal shape substantially free from grain boundaries in the growth direction. That is, the synthetic conditions of diamond are optimized and the polycrystalline diamond directed in a direction of (100) is thus obtained, which is substantially free from grain boundaries in the growth direction of diamond and in which, accordingly, scattering due to grain boundaries is hardly found.

Figure 7A:
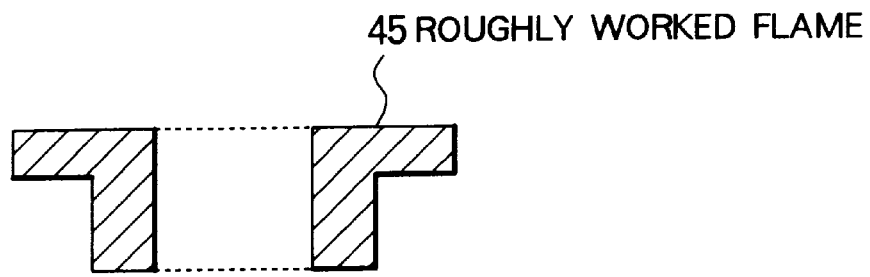
FIG. 7 is a schematic view of illustrating one example of a method of fitting a frame to a conflat flange.
Figure 7B:
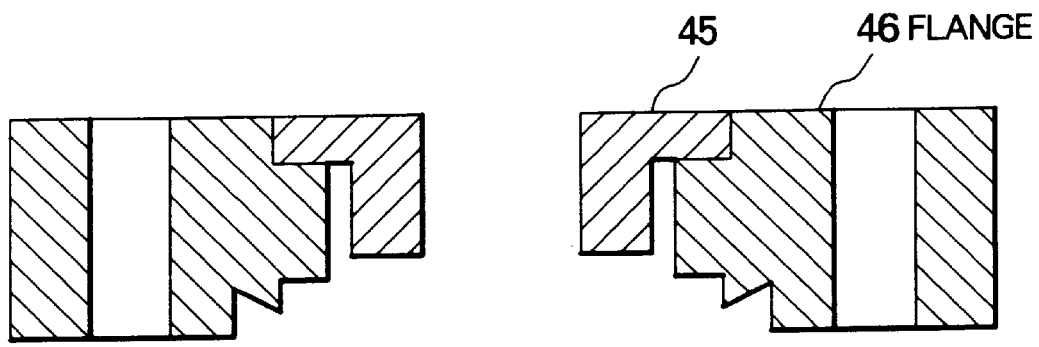
Figure 7C:
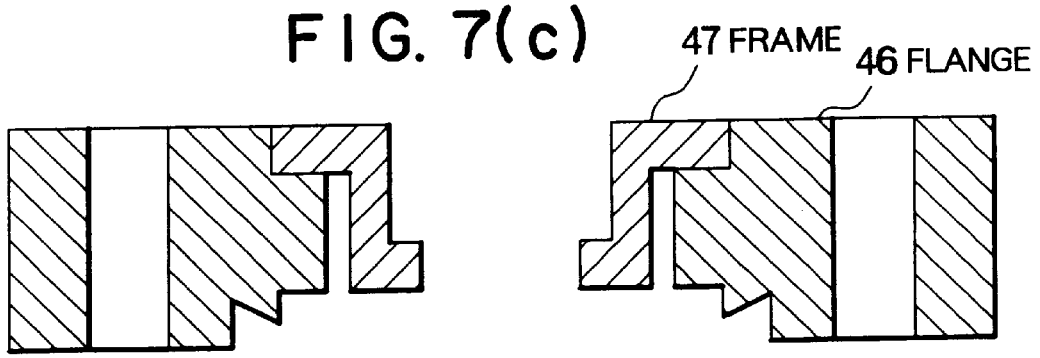

A process for the production of a window for an optical use according to the present invention will now be illustrated in detail:

A flange 46 having a size to be adapted to a vacuum apparatus is provided, to which a frame 45 roughly worked in a predetermined shape as shown in FIG. 7 (a) is bonded as shown in FIG. 7 (b). For this bonding can be used argon welding methods, electron beam welding methods, brazing methods, for example, using silver brazing agents, etc. Above all, the electron beam welding method can be carried out in vacuum without using any flux as in the brazing method and is thus preferred because of hardly meeting with problems such as contaminating or degassing.

After bonding in this way, the frame is worked in a final shape by lathe working. During the same time, if the working in a final shape is carried out before bonding, strain of the frame occurs in the frame during bonding and fitting of the window material is impossible. Thus, it is preferable to previously effect only rough working (FIG. 7 (*a*)) of the frame, bond this frame to a flange 46 (FIG. 7 (*b*)) and then work the frame 47 in the final shape (FIG. 7 (*c*)).

On the other hand, diamond of the window material is prepared as follows: Firstly, when using naturally occurring diamond or high temperature and high pressure synthesis diamond, the resulting single crystal diamond is subjected to laser working to obtain a desired shape. When using diamond by a gaseous phase synthesis method, on the other hand, a suitable substrate is prepared and the diamond is grown thereon to give a desired size and thickness by any one of various known methods (for example, microwave plasma assisted CVD methods, arc discharge plasma jet assisted CVD methods, hot filament assisted CVD methods, etc.). As the substrate, there can be used any known materials such as Si, Mo, SiC, etc. After crystal growth, the substrate is removed to obtain a self-standing film. The removal of the substrate is carried out by an acid treatment. The top surface and bottom surface are optionally subjected to mechanical polishing and smoothening, and removing of fine grains on the bottom surface side is carried out.

Then, the diamond window material and frame are bonded with an adhesive material. First, an area in contact with the frame, on the surface of the diamond window material is metallized by, for example, any known method such as vacuum vapor deposition method or ion plating method. Furthermore, the metallizing can be carried out by a method comprising coating a metallic composition of a metal dispersed in an organic solvent, as described before. In the method comprising coating a metallic composition, for example, "liquid gold" manufactured by NE CHEMCAT (gold content: 8 to 12%) is used, coated onto a desired area as uniformly as possible using a brush, heated in the atmosphere at 500 to 600° C. and then dried and calcined. The wetting property thereof to a diamond surface is affected by a solvent of the metallic composition or the state of the diamond surface. It is preferable to effect, with great care, compounding a solvent in the metallic composition.

The diamond window material metallized as described above is set on a frame, followed by bonding. One embodiment will be illustrated as to a case where bonding is carried out using AgCl. That is, melted AgCl is poured in between the diamond window material and frame. AgCl is poured over the full boundary between the window material and frame and thereafter gradually cooled to room temperature. Thus, AgCl is solidified, strongly bonded and subjected to vacuum sealing.

Furthermore, in setting the window material to the frame, bonding can be carried out by inserting a brazing material such as AgCl, Au-Si, Au-Sn, etc. in between the window material and frame, heating to at least the melting temperature of the adhesive material and then gradually cooling.

Diamond has a high light transmission in a very wide wavelength range and of all materials, the highest thermal conductivity. In addition, diamond has a high strength as can be seen from the highest hardness. Up to the present time, naturally occurring diamonds and synthetic diamonds have all been obtained with only small sizes and in spite of their excellent properties, their optical uses and other applications are much limited. With the progress of recent gaseous phase synthesis techniques, however, production of a flat plate with a relatively large area has been rendered possible in an economical manner.

When using diamond having the above described properties as a window material, the thickness of the window itself can be decreased to increase the transmittance and heat generation due to absorption in the window material can be suppressed. Having a high light transmission over a very wide range from vacuum ultraviolet to visible, infrared, moreover, the article of the present invention can also be applied to various uses needing frequent exchange of the window material, thereby largely reducing the frequency of exchange due to the wavelengths. In addition, because of the large thermal conductivity, the heat generated in the window is rapidly diffused and released from the flange to minimize temperature increase of the window itself.

The present invention will be illustrated in detail by the following examples:

EXAMPLE 1

This is an example using Ti/Mo/Au/AgCl as an adhesive material.

Figure 2:
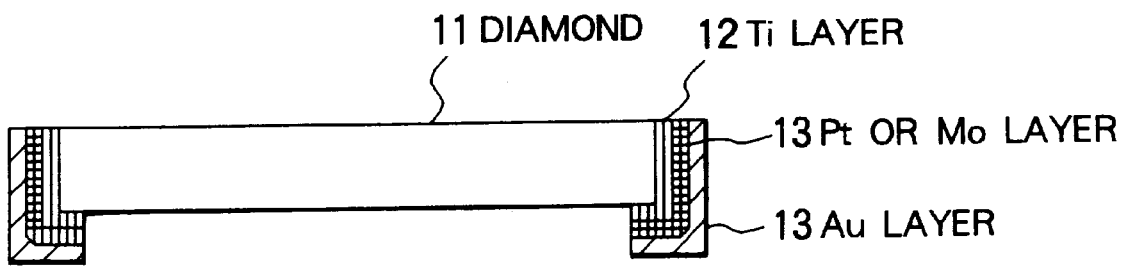
FIG. 2 is a schematic view of illustrating a metallized state on a diamond window material.

One side of a polycrystalline Si substrate (diameter 10 mm, thickness 2.5 mm) was subjected to a scratching treatment with diamond abrasive grains and to diamond growth by a microwave plasma assisted CVD method. After the top surface was mechanically polished and flattened, Si was removed by an acid treatment and the bottom surface side was also mechanically polished with a thickness of 10 $\mu$m in the similar manner to the top surface. According to an X-ray diffraction method, only a peak of (400) was observed and a diamond film orientated in (100) was confirmed. The bottom surface and side surface of the thus resulting diamond plate (diameter 10 mm, thickness 0.2 mm) were metallized with a Ti layer (thickness 0.2 $\mu$m), Mo layer (thickness 0.1 $\mu$m) and Au layer (thickness 0.3 $\mu$m) in this order, as shown in FIG. 2.

Figure 3:
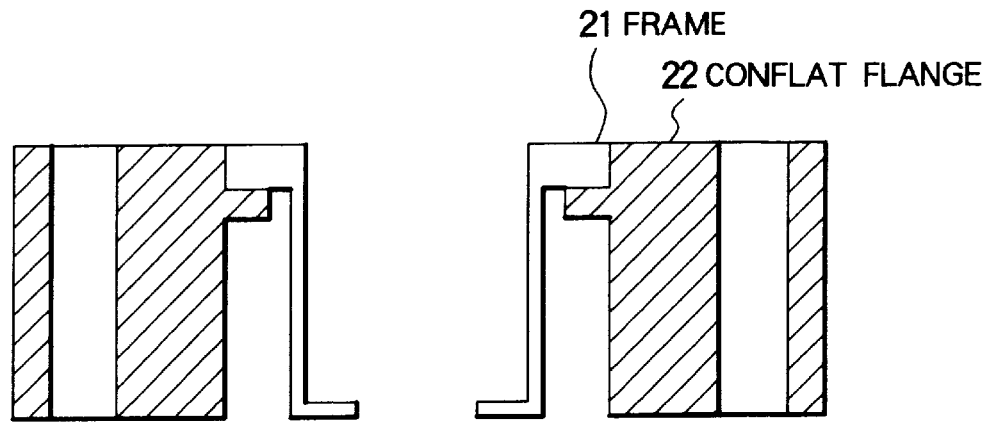
FIG. 3 is a schematic view of illustrating a state of welding a frame to a conflat flange.

On the other hand, as shown in FIG. 7, conflat flange 46 (made of SUS 304) was prepared, to which a roughly worked frame 45 (made of Ag) was bonded by an electron beam welding (accelerating voltage 70 kV, beam current 4 mA, overfocus) (FIG. 3). After bonding, lathe working was carried out in such a manner that the thickness T of the cylindrical part was 1 mm and the length d was 8 mm.

Figure 4A:
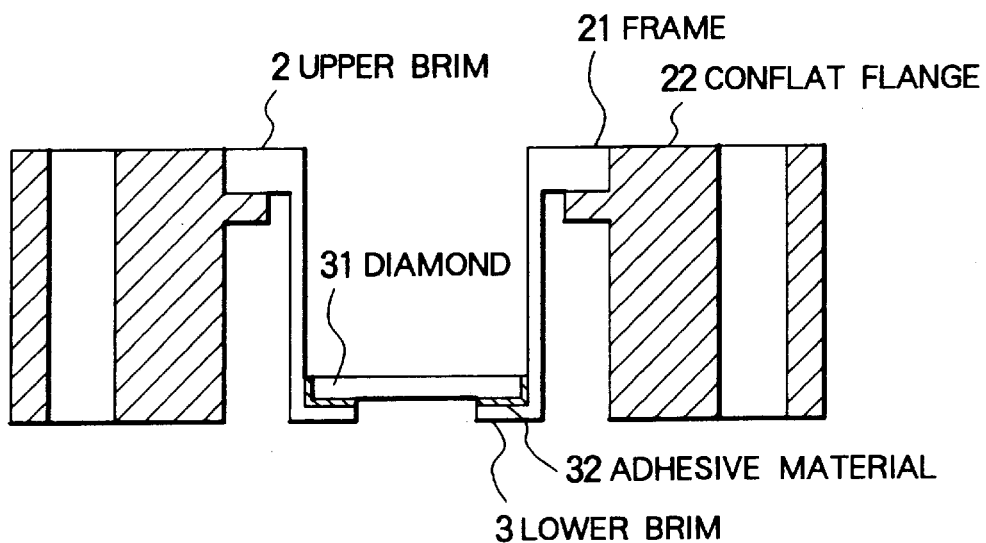
FIG. 4 is a schematic view of one example of the structure of the window for an optical use of the present invention.
Figure 4B:
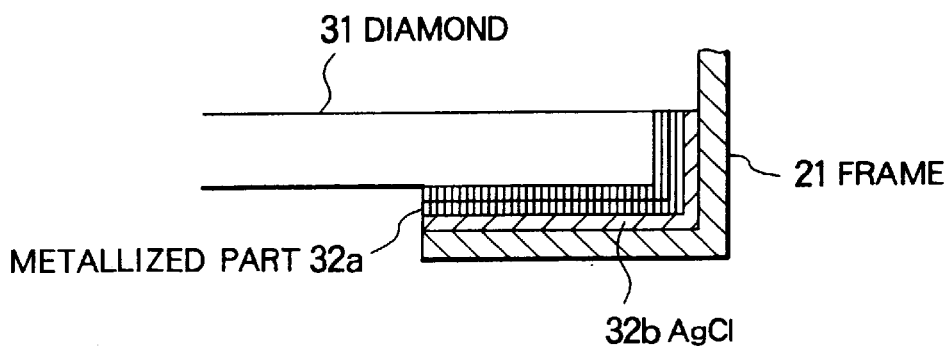

To the frame 21 bonded to conflat flange 22 in this way was bonded the window material of the above described metallized diamond to prepare a window for an optical use. The bonding was carried out by stacking the lower brim 3 of the frame 21 and the metallized part 32*a* of the above described metallized diamond through AgCl 32*b*, as shown in FIG. 4 and then subjected to a heat treatment at 500° C.

The thus obtained window for an optical use was arranged in an ultra-high vacuum apparatus and then subjected to repetition of a temperature raising and lowering test of from room temperature to 350° C. five times. After this test, there was found no breakage of the window material and a leakage rate of at most $10^{-9}$ Torr·l/sec (measurable limit). The transmission of the diamond plate for infrared to vacuum ultraviolet lights was not changed even after the above described bonding step to the flange. Furthermore, when the fitting to and removal from the vacuum apparatus were repeated thirty times, the foregoing properties were not changed.

EXAMPLE 2

This is an example using Ti/Pt/Au/Ag brazing material as an adhesive material. A diamond plate (diameter 10 mm, thickness 0.2 mm) was prepared in an analogous manner to Example 1 and the bottom surface and side surface thereof were metallized with a Ti layer (thickness 0.2 $\mu$m), Pt layer (thickness 0.1 $\mu$m) and Au layer (thickness 0.3 $\mu$m) in this order, as shown in FIG. 2.

On the other hand, conflat flange provided with the frame (silver frame) of the same material, shape and size as used in Example 1 was prepared. A brazing material consisting predominantly of Ag was arranged on the lower brim of this frame, on which the metallized part of the above described metallized diamond window material was stacked, and then the assembly was subjected to a heat treatment for bonding at 700° C. to prepare a window for an optical use.

When the thus prepared window for an optical use was subjected to the similar test to Example 1, the similar properties were obtained.

EXAMPLE 3

This is an example using Ti/Mo/Au/Au-Si brazing material as an adhesive material. A diamond plate (diameter 10 mm, thickness 0.2 mm) was prepared in an analogous manner to Example 1 and the bottom surface and side surface thereof were metallized with a Ti layer (thickness 0.2 $\mu$m), Mo layer (thickness 0.1 $\mu$m) and Au layer (thickness 0.3 m) in this order, as shown in FIG. 2.

On the other hand, conflat flange provided with the frame (silver frame) of the same material, shape and size as used in Example 1 was prepared. An adhesive material consisting of Au-Si was arranged on the lower brim of this frame, on which the metallized part of the above described metallized diamond window material was stacked, and then the assembly was subjected to a heat treatment for bonding at 400° C. to prepare a window for an optical use.

When the thus prepared window for an optical use was subjected to the similar test to Example 1, it was found that the window had the similar properties.

EXAMPLE 4

This is an example using liquid gold/AgCl as an adhesive material. A diamond plate (diameter 10 mm, thickness 0.2 mm) was prepared in an analogous manner to Example 1 and the same area of the diamond plate as the metallized area in Example 1 was coated with liquid gold (manufactured by NE CHEMCAT; gold paste for glass coating), followed by drying and calcining in the atmosphere at 520° C.

On the other hand, conflat frange provided with the frame (silver frame) of the same material, shape and size as used in Example 1 was prepared. The lower brim part of the frame and the metallized part of the above described metallized diamond window material were bonded with AgCl through a heat treatment at 500° C. to prepare a window for an optical use.

When the thus prepared window for an optical use was subjected to the similar test to Example 1, it was found that the window had the similar properties

COMPARATIVE EXAMPLE 1

This is an example using Ti/Mo/Au/AgCl brazing material as an adhesive material. A diamond plate (diameter 10 mm, thickness 0.2 mm) was prepared in an analogous manner to Example 1 and the bottom surface and side surface thereof were metallized with a Ti layer (thickness 0.2 $\mu$m), Mo layer (thickness 0.1 $\mu$m) and Au layer (thickness 0.3 $\mu$m) in this order, as shown in FIG. 2.

Figure 5:
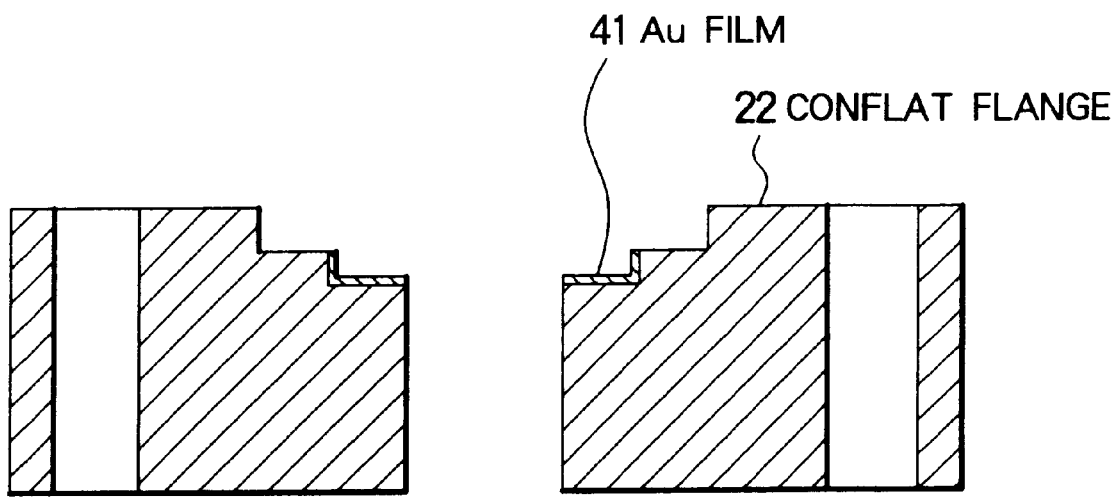
FIG. 5 is a schematic view of a shape of a conflat flange in Comparative Example 1.
Figure 6:
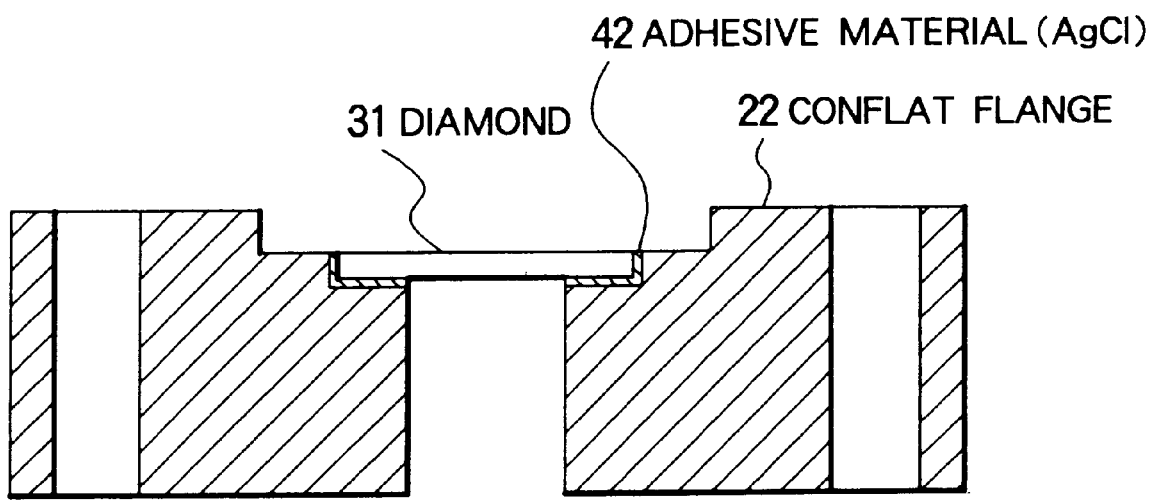
FIG. 6 is a schematic view of the structure of the window for an optical use of the present invention, prepared in Comparative Example 1.

On the other hand, conflat flange 22 (made of SUS 304) having the shape shown in FIG. 5 was prepared, on which gold was vapor deposited to form an Au film 41. Then, as shown in FIG. 6, this Au film 41 and the metallized part of the above described metallized diamond plate were bonded with AgCl 21 through a heat treatment for bonding at 500° C.

When the thus obtained window for an optical use was arranged in an ultra-high vacuum apparatus and then subjected to a temperature raising and lowering test of from room temperature to 350° C., the window material was cracked and vacuum could not be maintained.

When a similar window for an optical use was prepared using a diamond with a thickness of 0.1 mm, during fitting to an ultra-high vacuum apparatus, the diamond window was cracked due to strain of the flange itself.

EXAMPLE 5

This is an example using Ti/Mo/Au/AgCl as an adhesive material and a frame made of silver. As the frame, there was used a frame whose cylindrical part was thinner. In the similar manner to Example 1, a diamond plate (diameter 10 mm, thickness 0.2 mm) was prepared and the bottom surface and side surface thereof were metallized with a Ti layer (thickness 0.2 $\mu$m), Mo layer (thickness 0.1 $\mu$m) and Au layer (thickness 0.3 $\mu$m) in this order, as shown in FIG. 2.

On the other hand, conflat flange provided with a frame (silver frame) of the same material, shape and size as used in Example 1 was prepared, except using the frame having a cylindrical part with a thickness T of 0.08 mm and length d of 15 mm. The lower brim part of the frame and the metallized part of the above described metallized diamond window material were bonded in an analogous manner to Example 1 to prepare a window for an optical use.

When the thus obtained window for an optical use was arranged in an ultra-high vacuum apparatus and then subjected to the similar test to Example 1, it was found that the window had generally good properties. In a temperature raising and lowering test of from room temperature to 350° C., after repeatedly using ten times, pinholes occurred in the frame (silver frame) and high vacuum could not be maintained.

COMPARATIVE EXAMPLE 2

$CaF_2$ plate with a diameter of 10 mm and a thickness of 1 mm was prepared and the same area thereof as metallized on the diamond plate in Example 1 was coated with liquid gold (manufactured by NE CHEMCAT), followed by drying and calcining in the atmosphere at 520° C.

On the other hand, conflat flange provided with the frame (silver frame) of the same material, shape and size as used in Example 1 was prepared. The lower brim part of the frame and the metallized part of the above described metallized $CaF_2$ window material were bonded with AgCl through a heat treatment at 500° C. to prepare a window for an optical use.

When the thus prepared window for an optical use was subjected to the similar test to Example 1, it was found that the window was broken when fitting to and removing from the vacuum apparatus were repeated.

COMPARATIVE EXAMPLE 3

This is an example using the same frame (silver frame) as in Example 1 and an epoxy adhesives as an adhesive material. First, a diamond plate (diameter 10 mm, thickness 0.2 mm) was prepared in an analogous manner to Example 1 (The metallizing treatment thereof was not carried out).

On the other hand, conflat flange provided with the frame (silver frame) of the same material, shape and size as used in Example 1 was prepared. The above described diamond plate was fitted in the lower brim part of this frame and the epoxy adhesives was poured along the edge of the diamond plate, followed by bonding, to prepare a window for an optical use.

When the thus obtained window for an optical use was arranged in an ultra-high vacuum apparatus and then subjected to a temperature raising and lowering test of from room temperature to 350° C., there took place a leakage of at least $10^{-7}$ Torr·1/sec when the temperature of the flange was raised to at least 200° C.

Utility and Possibility on Commercial Scale

The window for an optical use of the present invention has excellent transmission property over a wide range of from infra-red to vacuum ultraviolet as well as excellent resistance to baking and capable of transmitting a light having a large energy, and can thus be applied to an ultra-high vacuum apparatus.

Furthermore, according to the production process of the present invention, the window for an optical use, having the above described excellent properties, can be produced in an economical and easy manner.

What is claimed is:

1. A window for an optical use, comprising a window material of diamond, a flange for a vacuum apparatus, a frame for bonding the diamond to the flange and an adhesive material for bonding the frame and diamond, wherein the adhesive material is an adhesive material having a laminated structure of Ti/Pt/Au/AgCl or Ti/Mo/Au/AgCl in order from the diamond side.

2. The window for an optical use, as claimed in claim 1, wherein the material of the frame is at least one member selected from the group consisting of Ag, Au and Cu.

3. The window for an optical use, as claimed in claim 1, wherein the frame is a cylindrical frame having optionally, at the upperside, a brim for bonding to a flange and at the lower side, another brim for bonding to a window material.

4. The window for an optical use, as claimed in claim 3, wherein the cylindrical part of the frame has a thickness of 0.05 to 5 mm.

5. The window for an optical use, as claimed in claim 1, wherein the diamond of the window material is a diamond prepared by a gaseous phase synthesis method.

6. The window for an optical use, as claimed in claim 5, wherein the diamond of the window material is polycrystalline diamond.

7. The window for an optical use, as claimed in claim 6, wherein the diamond of the window material is a diamond of a columnar crystal.

8. The window for an optical use, as claimed in claim 7, wherein the diamond of the window material is a diamond having an orientation of (100).

9. The window for an optical use, as claimed in claim 2, wherein the frame is a cylindrical frame having optionally, at the upperside, a brim for bonding to a flange and at the lower side, another brim for bonding to a window material.

10. The window for an optical use, as claimed in claim 2, wherein the diamond of the window material is a diamond prepared by a gaseous phase synthesis method.

11. The window for an optical use, as claimed in claim 3, wherein the diamond of the window material is a diamond prepared by a gaseous phase synthesis method.

12. The window for an optical use, as claimed in claim 4, wherein the diamond of the window material is a diamond prepared by a gaseous phase synthesis method.

13. A process for the production of a window for an optical use according to claim 1, which comprises a step of forming diamond on a substrate plate by a gaseous phase synthesis method, a step of removing the substrate plate from the diamond grown on the substrate plate, obtained in the former step, to obtain a diamond self-standing film, a step of flattening the surface of the diamond self-standing film, a step of fitting the frame to the flange, bonding the window material consisting of the diamond self-standing film to the frame through the adhesive material and thereby fitting the diamond window material to the flange.

14. The process for the production of a window for an optical use, as claimed in claim 13, wherein the step of removing the substrate plate from the diamond grown on the substrate plate to obtain a diamond self-standing film is carried out by dissolving the substrate plate with an acid.

15. The process for the production of a window for an optical use, as claimed in claim 13 or 14, wherein the step of bonding the window material consisting of the diamond self-standing film to the frame through an adhesive material and thereby fitting the diamond window material to the flange comprises a step of disposing a Ti/Pt/Au or Ti/Mo/Au laminate on a part or whole part of the diamond window material part in contact with the frame.

16. The process of the production of a window for an optical use, as claimed in any one of claims 13 or 14, wherein the step of fitting the frame to the flange is a step of welding a roughly worked frame to the flange and thereafter subjecting to lathing.

17. The process for the production of a window for an optical use, as claimed in any one of claims 13 or 14, wherein the step of fitting the diamond window material to the flange through the adhesive material comprises a step of heating the diamond window material coated with a Ti/Pt/Au or Ti/Mo/Au laminate, frame and flange at a temperature of at least the melting point of the AgCl, a step of melting and pouring the AgCl between the coated diamond window material and the frame, and a step of gradually cooling the diamond window material, the adhesive material, the frame, and the flange.

18. The process for the production of a window for an optical use, as claimed in claim 15, wherein the step of fitting the frame to the flange is a step of welding a roughly worked frame to the flange and thereafter subjecting to lathing.

19. The process for the production of a window for an optical use, as claimed in claim 15, wherein the step of fitting the diamond window material to the flange through the adhesive material comprises a step of heating the diamond window material coated with a Ti/Pt/Au or Ti/Mo/Au laminate, frame and flange at a temperature of at least the melting point of the AgCl, a step of melting and pouring the AgCl between the coated diamond window material and the frame, and a step of gradually cooling the diamond window material, the adhesive material, the frame, and the flange.

20. The process for the production of a window for an optical use, as claimed in claim 16, wherein the step of fitting the diamond window material to the flange through the adhesive material comprises a step of heating the diamond window material coated with a Ti/Pt/Au or Ti/Mo/Au laminate, frame and flange at a temperature of at least the melting point of the AgCl, a step of melting and pouring the AgCl between the coated diamond window material and the frame, and a step of gradually cooling the diamond window material, the adhesive material the frame, and the flange.

* * * * *